United States Patent
Wen et al.

(10) Patent No.: US 10,771,143 B1
(45) Date of Patent: Sep. 8, 2020

(54) SWITCHING METHOD FOR MULTIPLE ANTENNA ARRAYS AND ELECTRONIC DEVICE APPLYING THE SAME

(71) Applicant: INDUSTRIAL TECHNOLOGY RESEARCH INSTITUTE, Hsinchu (TW)

(72) Inventors: Chao-Kai Wen, Kaohsiung (TW); Zi-Hui Shen, Wanluan Township, Pingtung County (TW); Wan-Ting Shih, Nantou (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/728,606

(22) Filed: Dec. 27, 2019

(51) Int. Cl.
| | |
|---|---|
| H04B 17/00 | (2015.01) |
| H04B 7/00 | (2006.01) |
| H04B 7/08 | (2006.01) |
| H04B 17/20 | (2015.01) |
| H04B 7/0408 | (2017.01) |

(52) U.S. Cl.
CPC ......... H04B 7/0805 (2013.01); H04B 7/0408 (2013.01); H04B 17/20 (2015.01)

(58) Field of Classification Search
CPC ........ H04B 7/04; H04B 7/043; H04B 7/0486; H04B 7/0617; H04B 7/0632; H04B 7/0691; H04B 7/0888; H04B 7/0897; H04B 17/318; H04B 17/327; H04B 17/336;
(Continued)

(56) References Cited

U.S. PATENT DOCUMENTS 7,171,164 B2 * 1/2007 Ylitalo .................. H04B 7/005
                                                                375/148
8,781,420 B2    7/2014 Schlub et al.
(Continued)

FOREIGN PATENT DOCUMENTS

| CN | 107181705 A | 9/2017 |
|---|---|---|
| TW | 201820801 A | 6/2018 |

OTHER PUBLICATIONS

Alammouri et al., "Hand Grip Impact of 5G mmWave Mobile Devices", IEEE, 2019, vol. 7, pp. 60532-60544 ( 13 pages).
(Continued)

Primary Examiner — Quochien B Vuong
(74) Attorney, Agent, or Firm — Birch, Stewart, Kolasch & Birch, LLP

(57) ABSTRACT

A switching method for multiple antenna arrays is disclosed which including: turning on a number of antenna arrays of an electronic device, and obtaining multiple received powers of a beam signal; turning off the antenna array(s) other than the antenna array having the largest received power, and calculating multiple first power ratio parameters according to the received powers; calculating a first channel information of the antenna array which is turned on; calculating a first virtual channel information of each of the antenna arrays which are turned off according to the first channel information, the first power ratio parameter corresponding to each of the antenna arrays which are turned off and an angle mapping table; and selecting one of the antenna arrays to turn on according to the first channel information and all the first virtual channel information, and turning off the rest antenna array(s).

10 Claims, 3 Drawing Sheets

(58) Field of Classification Search
CPC . H04W 16/28; H04W 24/02; H04W 56/0095; H04W 72/02; H04W 72/085

See application file for complete search history.

(56) References Cited

U.S. PATENT DOCUMENTS

| | | | |
|---|---|---|---|
| 9,414,285 | B2 | 8/2016 | Hampel et al. |
| 9,549,290 | B2 | 1/2017 | Smith |
| 9,948,377 | B1* | 4/2018 | Kim .................. H04B 7/0691 |
| 9,960,828 | B2* | 5/2018 | Petersson ............ H04B 7/0617 |
| 10,330,770 | B2* | 6/2019 | Silverman ........... H04B 7/0802 |
| 10,469,138 | B2* | 11/2019 | Frenne .................. H04L 5/005 |
| 2003/0228857 | A1 | 12/2003 | Macki |
| 2013/0328723 | A1 | 12/2013 | Rappaport |
| 2019/0150003 | A1* | 5/2019 | He ........................ H04W 16/28 342/368 |
| 2019/0173592 | A1 | 6/2019 | Wen et al. |
| 2019/0214708 | A1 | 7/2019 | Ouyang et al. |
| 2019/0363453 | A1* | 11/2019 | Yu ............................ H01Q 3/24 |

OTHER PUBLICATIONS

Chiu et al., "Active Learning and CSI Acquisition for mmWave Initial Alignment", arXiv: 1812.07722v4 [cs.IT], Sep. 4, 2019, pp. 1-16 (16 pages).

Li et al., "Analog Beam Trackig in Linear Antenna Arrays: Convergence, Optimality, and Performance", Asilomar, 2017, pp. 1193-1198 ( 6 pages).

Mamandipoor et al., "Newtonized Orthogonal Matching Pursuit: Frequency Estimation Over the Continuum", IEEE Transactions on Signal Processing, vol. 64, No. 19, Oct. 1, 2016, pp. 5066-5081 (16 pages).

Mo et al., "Beam Codebook Design for 5g mmWave Terminals", IEEE, vol. 7, 2019, pp. 98387-98404 (18 pages).

Raghavan et al., "Antenna Placement and Performance Tradeoffs With Hand Blockage in Millimeter Wave Systems", IEEE Transactions on Communications, Apr. 2019, vol. 67, No. 4, pp. 3082-3096 (15 pages).

Raghavan et al., "Millimeter-Wave MIMO Prototype: Measurements and Experimental Results", IEEE Communications Magazine, Jan. 2018, pp. 202-209 (8 pages).

Raghavan et al., "Spatio-Temporal Impact of Hand and Body Blockage for Millimeter-Wave User Equipment Design at 28 GHz", Channel Models and Measurements for 5G, IEEE Communication Magazine, Dec. 2018, pp. 46-52 (7 pages).

Raghavan et al., "Statistical Blockage Modeling and Robusness of Beamforming in Millimeter-Wave Systems", IEEE Transactions on Microwave Theory and Techniques, vol. 67, No. 7, Jul. 2019, pp. 3010-3024 (15 pages).

\* cited by examiner

SWITCHING METHOD FOR MULTIPLE ANTENNA ARRAYS AND ELECTRONIC DEVICE APPLYING THE SAME

TECHNICAL FIELD

The application relates to a switching method for multiple antenna arrays and an electronic device applying the same.

BACKGROUND

With the advent of 5G communications, millimeter wave, beamforming, and antenna arrays are becoming important. In general, the transmission and reception of millimeter waves require the use of antenna arrays and beamforming. Signals of millimeter waves transmitted by beamforming are easily obscured by obstacles, so that the receiver may not be able to receive the signals or analyze the received signals. Given the above issue, a current approach is to set multiple antenna arrays at the receiver for receiving. However, the related art has problems with high power consumption and a great time cost for switching between multiple antenna arrays.

SUMMARY OF THE DISCLOSURE

An embodiment of the present application discloses an electronic device. The electronic device includes a plurality of antenna arrays, a storage unit, and an operation unit. Each of the antenna arrays includes a power detection unit and a plurality of antenna units for beamforming. The storage unit is configured to store an angle mapping table. The operation unit is coupled to the antenna arrays and the storage unit, and is configured to perform: turning on the antenna arrays, and obtaining a receiving power of a beam signal by the power detection unit of each of the antenna arrays; turning off the antenna array other than the antenna array which has the greatest receiving power, and calculating a first power ratio parameter corresponding to each of the antenna array which is turned off according to the receiving powers; receiving the beam signal by the antenna array which is turned on, and calculating a first channel information of the beam signal corresponding to the antenna array which is turned on; calculating a first virtual channel information corresponding to each of the antenna array which is turned off according to one or more first gains, one or more first delays and one or more first incidence angles of one or more paths from which the beam signal is received derived from the first channel information corresponding to the antenna array which is turned on, the first power ratio parameter corresponding to each of the antenna array which is turned off and the angle mapping table; and turning on one of the antenna arrays and turning off the other according to the first channel information and the first virtual information. The angle mapping table records a transformation relationship of incidence angle for the same incident beam signal between the antenna arrays.

Another embodiment of the present application discloses a method for switching multiple antenna arrays. the method is performed by an operation unit of an electronic device. The method includes: turning on a plurality of antenna arrays, and obtaining a receiving power of a beam signal by a power detection unit of each of the antenna arrays; turning off the antenna array other than the antenna array which has the greatest receiving power, and calculating a first power ratio parameter corresponding to each of the antenna array which is turned off according to the receiving powers; receiving the beam signal by the antenna array which is turned on, and calculating first channel information of the beam signal corresponding to the antenna array which is turned on; calculating a first virtual channel information corresponding to each of the antenna array which is turned off according to one or more first gains, one or more first delays and one or more first incidence angles of one or more paths from which the beam signal is received derived from the first channel information corresponding to the antenna array which is turned on, the first power ratio parameter corresponding to each of the antenna array which is turned off and the angle mapping table; and turning on one of the antenna arrays and turning off the other according to the first channel information and the first virtual information. The angle mapping table records a transformation relationship of incidence angle for the same incident beam signal between the antenna arrays.

The above and other aspects of the invention will become better understood about the following detailed description of the preferred but non-limiting embodiment(s). The following description is made regarding the accompanying drawings.

DETAILED DESCRIPTION OF DISCLOSED EMBODIMENTS

Figure 1:
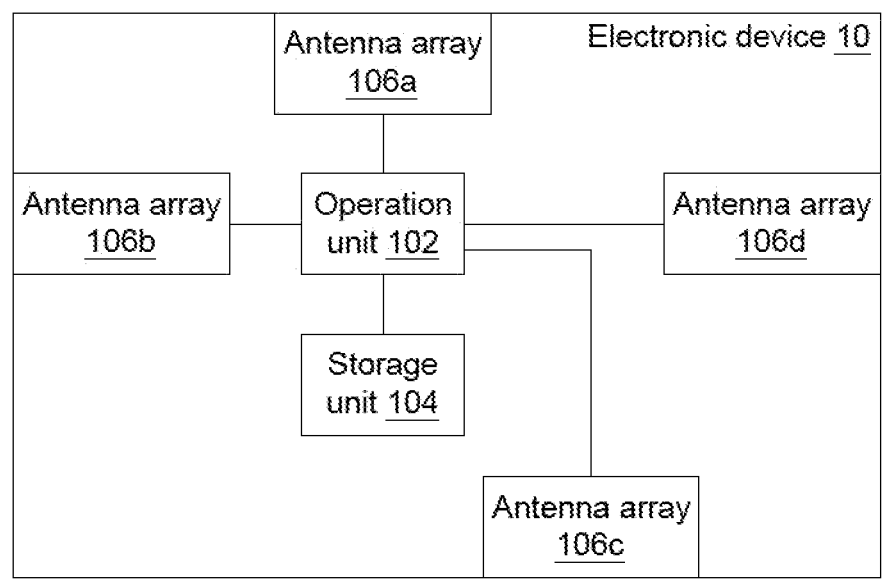
FIG. 1 shows an electronic device according to an embodiment of the present application.

Referring to FIG. 1, FIG. 1 shows an electronic device according to an embodiment of the present application. The electronic device 10 may be a portable device such as a smartphone or a tablet computer. The electronic device 10 includes an operation unit 102, a storage unit 104 and several antenna arrays 106a-106d.

The operation unit 102 may be a central processing unit (CPU), or a programmable micro control unit (MCU) for a general purpose or a specific purpose, a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), a communication chip for the specific purpose or the like or a combination of the above.

The storage unit 104 is coupled to the operation unit 102. The storage unit 104 may be a random access memory (RAM), read-only memory (ROM), flash memory, a phase changed memory, a hard disk drive (HDD), a register, a solid state drive (SSD) or the like or a combination of the above. The storage unit 104 is configured to store an angle mapping table. The angle mapping table records several angle difference parameters between any two of the antenna arrays. Details of the angle mapping table may be illustrated below.

The antenna arrays 106a-106d are coupled to the operation unit 102. Each of the antenna arrays 106a-106d may include several antenna units (not shown) and a power detection unit (not shown). The antenna units are configured as an array, for implementing beamforming. The power detection unit is configured to detect a receiving power of a beam signal. In an embodiment, the power detection unit detects the receiving power of the beam signal from a transmission terminal (e.g., a base station) or after it has been reflected/refracted by downsampling. In this embodiment, the number of the antenna arrays is four but may be any number that greater than one in other embodiments. In an embodiment, the number of antenna units of each of the antenna arrays may be any number that greater than one. Also, the present application does not limit the arranged position of the antenna arrays.

In an embodiment, electronic device 10 may be an electronic device having a function of millimeter wave communication. The electronic device 10 receives and transmits millimeter wave signals by antenna arrays 106a-106d.

In an embodiment, since the distances between the antenna arrays 106a-106d of the electronic device 10 are small, for the same signal, it can be considered that the antenna arrays 106a-106d receive the signal via the same one or more transmission paths. However, the incidence angles of the received signal received by the antenna arrays 106a-106d may vary depending on the position of the antenna arrays 106a-106d. On the other hand, when the electronic device 10 is used by a user, the received power of the signal received by some antenna arrays may be reduced by holding the electronic device 10.

Figure 2:
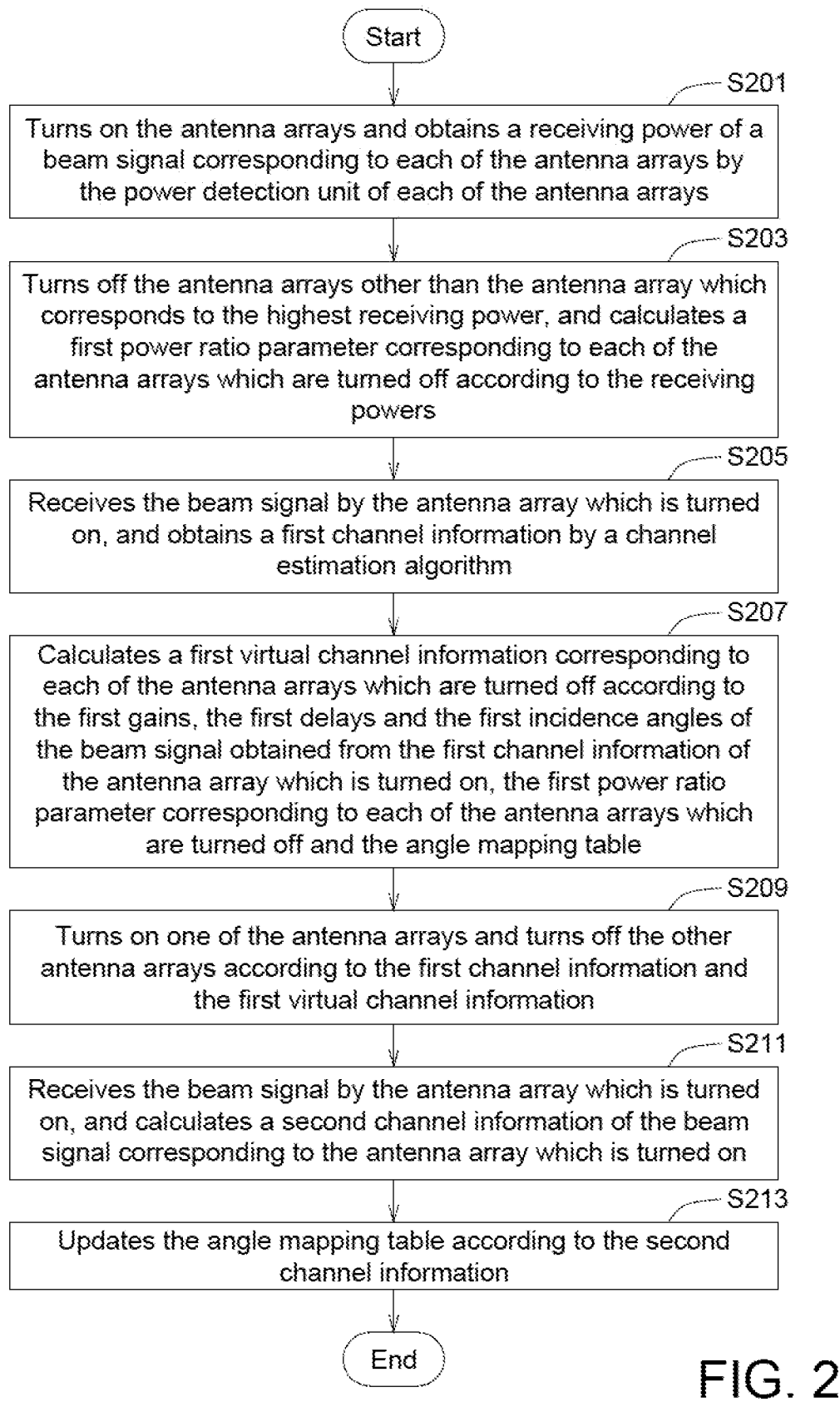
FIG. 2 shows a flowchart of a switching method for multiple antenna arrays according to an embodiment of the present application.

Referring to FIG. 2, FIG. 2 shows a flowchart of a switching method for multiple antenna arrays according to an embodiment of the present application. The switching method may be applied to the electronic device 10 and performed by the operation unit 102.

In S201, the operation unit 102 turns on the antenna arrays 106a-106d and obtains a receiving power of a beam signal corresponding to each of the antenna arrays 106a-106d by the power detection unit of each of the antenna arrays 106a-106d. In an example of obtaining the receiving powers by downsampling, it is assumed that the beam signal includes ten bits. The power detection unit of the antenna array 106a may use two bits of the beam signal for detecting the receiving power of the beam signal corresponding to the antenna array 106a; the power detection unit of the antenna array 106b may use two bits of the beam signal for detecting the receiving power of the beam signal corresponding to the antenna array 106b, and so on. The receiving power of the beam signal corresponding to the antenna arrays 106a, 106b, 106c, and 106d are respectively RPa, RPb, RPc, and RPd. Noted that the above approach of downsampling is merely exemplary, and the present application does not limit the approach for obtaining the receiving powers.

In S203, the operation unit 102 turns off the antenna arrays other than the antenna array which corresponds to the highest receiving power and calculates a first power ratio parameter corresponding to each of the antenna arrays which are turned off according to the receiving powers. For example, it is assumed that the receiving power RPa of the beam signal corresponding to the antenna array 106a is the highest one among the four receiving powers RPa~RPd obtained in S201. The operation unit 102 may keep the antenna array 106a on, and turns off the antenna arrays 106b-106d. Then, the operation unit 102 may calculate a ratio of the receiving power corresponding to each of the antenna arrays 106b-106d to the receiving power corresponding to the antenna array 106a as the first power ratio parameter corresponding to each of the antenna arrays 106b-106d which are turned off. For example, the operation unit 102 may obtain the first power ratio parameter $p_b$ corresponding to the antenna array 106b by dividing the received power corresponding to the antenna array 106b by the received power corresponding to the antenna array 106a (i.e., $p_b$=RPb/RPa). By the same analogy, the first power ratio parameters $p_c$ and $p_d$ of the antenna arrays 106c-106d corresponding to the antenna array 106a can be obtained.

Step S201 may be used to preliminary estimate which antenna array receives the beam signal with the highest receiving power. Step S203 may be used to select which antenna array is turned on initially, and to estimate the proportional relationship between the receiving power of the antenna arrays which are turned off and the receiving power of the antenna array which is turned on.

In S205, the operation unit 102 receives the beam signal by the antenna array which is turned on and obtains a first channel information $H_1$ by a channel estimation algorithm. With the first channel information $H_1$, an algorithm, for example, Newtonized orthogonal matching pursuit (NOMP) algorithm, can be used to analyze and obtain one or more first gains, one or more first delays and one or more first incidence angles of the beam signal corresponding to the antenna array which is turned on. The beam signal may be received via one or more paths to obtain the first channel information $H_1$. Each of the paths may have a corresponding first gain, a corresponding first delay, and a corresponding first incidence angle. The channel estimation algorithm may be least squares method or linear minimum mean-square error algorithm. However, the present disclosure is not limited by the above algorithms. The first channel information $H_1$ corresponding to the antenna array 106a can be represented as:

$$H_1 = \sum_{l=0}^{L-1} g_{1l} V(\tau_{1l}, \theta_{1l})$$

Wherein, L is the number of the paths which receive the beam signal, $g_{1l}$ is the first gain corresponding to the l-th path, $\tau_{1l}$ is the first delay corresponding to the l-th path, $\theta_{1l}$ is the first incidence angle corresponding to the l-th path, $V(\tau_{1l}, \theta_{1l})$ is a matrix obtained by performing a cross product operation with $\tau_{1l}$ and $\theta_{1l}$. The number of the paths that receive the beam signal is L. The first gain $g_{1l}$ corresponding to the l-th path, the first delay $\tau_{1l}$ corresponding to the l-th path and the first incidence angle $\theta_{1l}$ corresponding to the l-th path may be derived from the first channel information $H_1$ of the antenna array which is turned on and the above formula. Step S205 may be used to obtain the first channel information $H_1$ of the antenna array which is turned on, by measurement and accurate calculation.

In S207, the operation unit 102 calculates a first virtual channel information corresponding to each of the antenna arrays which are turned off according to the first gains, the first delays and the first incidence angles of the beam signal obtained from the first channel information of the antenna array which is turned on, the first power ratio parameter corresponding to each of the antenna arrays which are turned off and the angle mapping table.

Furthermore, the first virtual channel information $H_k$ corresponding to each of the antenna arrays which are turned off may be calculated according to the first gains, the first delays and the first incidence angles of the first channel information of the antenna array which is turned on, the first power ratio parameter corresponding to each of the antenna arrays which are turned off and an angle difference parameter of the angle mapping table. In the embodiment corresponding to FIG. 1, there are totally three antenna arrays are turned off. Therefore, k may be 2, 3, 4, and respectively correspond to the antenna array which are turned off:

$$H_k = \sum_{l=0}^{L-1} (g_{1l} * p_{1k}) V(\tau_{1l}, \theta_{1l} + \theta_k)$$

Wherein, L is the number of the paths which receive the beam signal, $g_{1l}$ is the first gain corresponding to the l-th path, $\tau_{1l}$ is the first delay corresponding to the l-th path, $\theta_{1l}$ is the first incidence angle corresponding to the l-th path, $V(\tau_{1l}, \theta_{1l})$ is a matrix obtained by performing a cross product operation with $\tau_{1l}$ and $\theta_{1l}$, $p_{1k}$ is the first power ratio parameter corresponding to the antenna array which is turned off, $\theta_k$ is the angle difference parameter between the antenna array which is turned on and the antenna array which is turned off.

Figure 3:
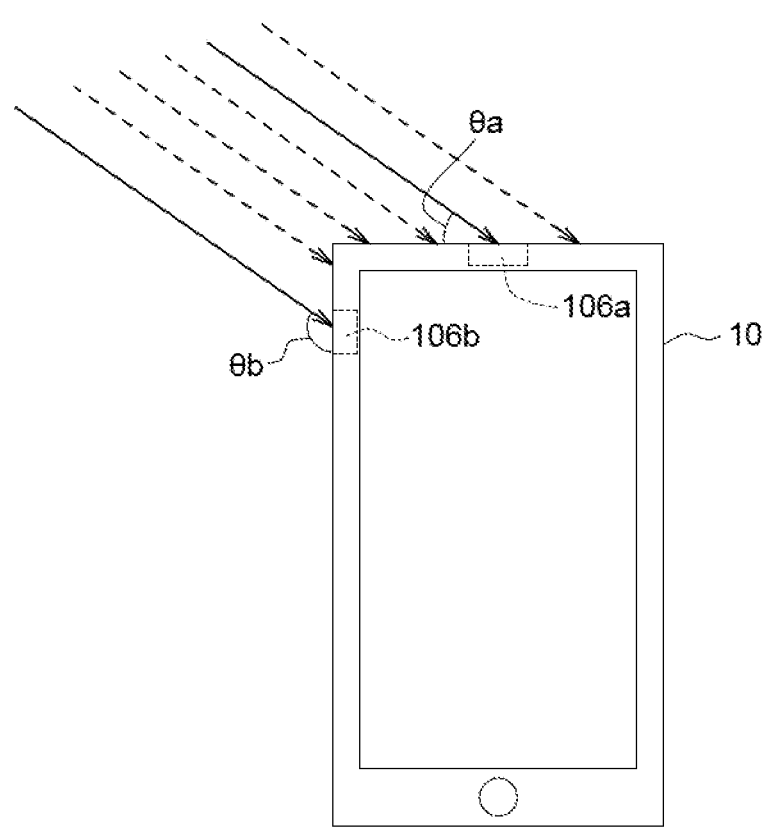
FIG. 3 shows a schematic diagram of a first incidence angle and a second incidence angle.

The angle difference parameter $\theta_k$ can be obtained by looking up the angle mapping table. For a clear understanding, referring to FIG. 3, a real case is illustrated. In this embodiment, in the case that the antenna arrays 106a and 106b are both turned on for receiving signals, the measurement process is to record the estimated incidence angles $\theta_a$, $\theta_b$ and the angle difference parameter $\theta_k$ every 10 degrees from the 90 degree vertical of the antenna array 106a to 90 degree vertical of the antenna array 106b. Therefore, by the above measurement process, it can be noted that the angle difference parameters $\theta_k$ corresponding to the antenna arrays 106a and 106b are about 80 degrees to 90 degrees in Table 1 shown below. In this way, the plurality of the angle difference parameters between each two of the antenna arrays 106a~106d can be recorded in the angle mapping table.

TABLE 1

| $\theta_a$ (degree) | $\theta_b$ (degree) | $|\theta_a - \theta_b| = \theta_k$ (degree) |
| --- | --- | --- |
| 87.9 | 12.6 | 75.3 |
| 98.5 | 8.1 | 90.4 |
| 111.6 | 29.0 | 82.6 |
| 120.2 | 32.5 | 87.7 |
| 128.5 | 41.9 | 86.6 |
| 139.2 | 50.0 | 89.2 |
| 143.4 | 60.2 | 83.2 |
| 154.6 | 69.0 | 85.6 |
| 163.0 | 79.7 | 83.3 |
| 162.8 | 90.1 | 72.7 |

Table 1 is a part of the angle mapping table according to an embodiment of the present application, wherein the column of $\theta_a$ records the incidence of the calculated channel information of the antenna array 106a, the column of $\theta_b$ records the corresponding incidence angle of the antenna array 106b. For example, if the antenna array 106a is turned on in S203 and the first incidence angle $\theta_{1l}$ of the beam signal received by the antenna array 106a via the l-th path is calculated as 98.5 degrees in S205, the incidence angle corresponding to the first virtual channel information $H_k$ (k=2) of the antenna array 106b is 8.1 degrees, and the angle difference parameter $\theta_k$ is about 90 degrees. It can be observed in Table 1 that when $\theta_a$ falls within 98.5 to 163 degrees, the angle difference parameter $\theta_k$ between the incidence angle $\theta_a$ of the antenna array 106a and the incidence angle $\theta_b$ of the antenna array 106b is about 80 to 90 degrees. In an embodiment, the angle difference parameter may be calculated by interpolation according to the angle mapping table. For example, when $\theta_{1l}$ is within 98.5 to 163 degrees, the incidence angle corresponding to the antenna array 106b can be calculated by the interpolation.

In other words, the angle mapping table records a relationship of incidence angle transformation among the antenna arrays for the same beam signal. In an embodiment, the angle mapping table may be pre-configured in the electronic device 10 before leaving the factory. Before the electronic device 10 leaves the factory, the angle mapping table can be established by: turning on all the antenna arrays; receiving the same beam signal and recording the incidence differences between the antenna arrays; changing the incidence angle of the beam signal and repeating the above operations. For example, taking the electronic device 10 of FIG. 1 as the example, the antenna array 106a~106d are respectively arranged on the four sides of the electronic device 10. If the antenna arrays 106a~106d are one dimension, the range of signal receiving is about 0~180 degrees. For the same beam signal, a similar incidence angle may be detected by the antenna array 106a and the antenna array 106c, and a similar incidence angle may be detected by the antenna array 106b and the antenna array 106d. The angle mapping table may be completed by performing measurement and recording for various incidence angles.

Step S207 may be used to obtain the first virtual channel information of the antenna arrays which are turned off by estimation and looking up the table when only one of the antenna arrays is turned on.

In S209, the operation unit 102 turns on one of the antenna arrays and turns off the other antenna arrays according to the first channel information and the first virtual channel information. In an embodiment, the operation unit 102 may transform each of the first channel information and the first virtual channel information to a received signal to noise ratio (RSNR), and selects the antenna array to be turned on according to the RSNRs corresponding to the antenna arrays. For example, the operation unit 102 may turn on the antenna array which has the greatest RSNR and turns off the other antenna arrays. For example, assuming that the antenna array 106a is estimated as the antenna array which has the greatest receiving power in S201 and the antenna array 106b is derived as the antenna array which has the greatest RSNR in S209, the antenna array 106b may be turned on, the antenna array 106a may be turned off, and the antenna arrays 106c, 106d may be kept off in S209. In the above example, the antenna array which is turned on in S205 is the antenna array 106a, and the antenna array which is turned on in S209 is the antenna array 106b. That is, the operation unit 102 operates changing the antenna array which is turned on. In another example, assuming that the antenna array 106a is estimated as the antenna array which has the greatest receiving power in S201 and the antenna array 106a is derived as the antenna array which has the greatest RSNR in S209, the antenna array 106a may be kept on, and the antenna arrays 106b-106d may be kept off in S209. That is, the antenna array which is turned on in S205 and that in S209 are the same. The approach for transforming the channel information to RSNR may be an approach which is well-known in the art, and the present application does not limit thereto.

In S211, the operation unit 102 receives the beam signal by the antenna array which is turned on and calculates a second channel information of the beam signal corresponding to the antenna array which is turned on. Noted that the operation unit 102 receives the beam signal by the antenna array which is turned on, obtains the second channel information by using the channel estimation algorithm, and derives a second gain, a second delay and a second incidence angle of each of the paths (L paths in total) from which the beam signal is received according to the second channel information by using an algorithm such as Newtonized orthogonal matching pursuit (NOMP). Step S211 is optional. When the antenna which is turned on in step S209 differs from the antenna array which is turned on in S205 (i.e., the antenna array which is turned on changes), steps S211 and S213 may be performed. Step S211 is similar to step S205, the difference is that the operation unit 102 calculates the second gains $g_{2l}$, the second delays $\tau_{2l}$ and the second incidence angles $\theta_{2l}$ by the channel information (e.g., the second channel information) derived from the antenna array which is turned on, and calculates a second virtual channel information corresponding to each of the antenna arrays which are turned off with a second power ratio parameter $p_{2k}$ corresponding to each of the antenna arrays which is turned off and the angle difference parameter $\theta_k$ in the angle mapping table by using the following formula. Wherein, if the antenna array which is turned on is switched from the antenna array 106a to the antenna array 106b in S209, according to the receiving power of each of the antenna arrays 106a~106d in S211, the operation unit 102 may calculate a ratio of the receiving power corresponding to each of the antenna arrays 106a,106c,106d which are turned off to the receiving power corresponding to the antenna array 106b as the second power ratio parameter $p_{2k}$ corresponding to each of the antenna arrays 106a, 106c, 106d which are turned off. Thereby, the second virtual channel information of each of the antenna arrays which are turned off may be obtained by estimation and looking up the table.

$$H_k = \sum_{l=0}^{L-1} (g_{2l} * p_{2k}) V(\tau_{2l}, \theta_{2l} + \theta_k)$$

In S213, the operation unit 102 updates the angle mapping table according to the second channel information. The operation unit 102 can update the value (the angle difference parameter $\theta_k$) in the corresponding column of the angle mapping table by the second incidence angle of the actual channel information (i.e., the second channel information). In a real case, there may be some changes in the outward appearance, usage habit or environment after the electronic device is produced. For example, a user may attach a protective case to a smartphone. This may make the angle mapping table need to be modified. With steps S211 and S213, the electronic device may have a function of online learning, so that the electronic device may be able to continuously update the angle mapping table and improve the performance of receiving beam signals.

According to the performance of the electronic device, the incidence angle derived in steps S205 and S211 may include a vertical incidence angle and a horizontal incidence angle. In this embodiment, the angle mapping table may include a horizontal angle mapping part and a vertical angle mapping part, wherein the horizontal angle mapping part records a transformation of horizontal incidence angle between the antenna arrays, and the vertical angle mapping part records a transformation of vertical incidence angle between the antenna arrays. That is, the calculated first channel information or the calculated second channel information includes parameters of horizontal incidence angle and vertical incidence angle. When performing the estimation of the first virtual channel information or the second virtual channel information, the horizontal incidence angle of the first virtual channel information or the second virtual channel information can be obtained by looking up the horizontal angle mapping part of the angle mapping table, and the vertical incidence angle of the first virtual channel information or the second virtual channel information can be obtained by looking up the vertical angle mapping part of the angle mapping table.

In conclusion, the present application can efficiently reduce the power consumption and time cost of switching between multiple antenna arrays. Furthermore, the present application can update the angle mapping table by comparing the actual incidence angle with the incidence angle recorded in the angle mapping table, so that the angle mapping table can adapt to the changing of outward appearance, usage habit or environment of the electronic device after the electronic device is produced.

While the invention has been described by way of example and in terms of the preferred embodiment (s), it is to be understood that the invention is not limited thereto. On the contrary, it is intended to cover various modifications and similar arrangements and procedures, and the scope of the appended claims, therefore, should be accorded the broadest interpretation to encompass all such modifications and similar arrangements and procedures.

What is claimed is:

1. An electronic device, including:
    a plurality of antenna arrays, each of the antenna arrays including a power detection unit and a plurality of antenna units for beamforming;
    a storage unit, configured to store an angle mapping table; and
    an operation unit, coupled to the antenna arrays and the storage unit, and configured to perform:
        turning on the antenna arrays, and obtaining a receiving power of a beam signal by the power detection unit of each of the antenna arrays;
        turning off the antenna array other than the antenna array which has the greatest receiving power, and calculating a first power ratio parameter corresponding to each of the antenna array which is turned off according to the receiving powers;
        receiving the beam signal by the antenna array which is turned on, and calculating a first channel information of the beam signal corresponding to the antenna array which is turned on;
        calculating a first virtual channel information corresponding to each of the antenna array which is turned off according to one or more first gains, one or more first delays and one or more first incidence angles of one or more paths from which the beam signal is received derived from the first channel information corresponding to the antenna array which is turned on, the first power ratio parameter corresponding to each of the antenna array which is turned off and the angle mapping table; and
        turning on one of the antenna arrays and turning off the other according to the first channel information and the first virtual information,
    wherein the angle mapping table records a transformation relationship of incidence angle for the same incident beam signal between the antenna arrays.

2. The electronic device according to claim 1, wherein after the operation of turning on one of the antenna arrays and turning off the other according to the first channel information and the first virtual information, when the antenna array which is turned on is switched from one to another, the operation unit is further configured to perform:

receiving the beam signal by another antenna array which is turned on, and calculating a second channel information of the beam signal corresponding to another antenna array which is turned on; and updating the angle mapping table according to the second channel information.

3. The electronic device according to claim 2, wherein in the operation of receiving the beam signal by another antenna array which is turned on, and calculating the second channel information of the beam signal corresponding to another antenna array which is turned on, the operation unit calculates a second virtual channel information corresponding to each of the antenna array which is turned off according to one or more second gains, one or more second delays and one or more second incidence angles of one or more paths from which the beam signal is received derived from the second channel information corresponding to another antenna array which is turned on, a second power ratio parameter corresponding to each of the antenna array which is turned off and the angle mapping table.

4. The electronic device according to claim 3, wherein in the operation of updating the angle mapping table according to the second channel information, the operation unit updates the angle mapping table according to the second incidence angle.

5. The electronic device according to claim 1, wherein in the operation of turning on one of the antenna arrays and turning off the other according to the first channel information and the first virtual information, the operation unit transforms each of the first channel information and the first virtual channel information to a RSNR and selects the antenna array which has the greatest RSNR to be turned on.

6. A method for switching multiple antenna arrays, performing by an operation unit of an electronic device, the method comprising:

turning on a plurality of antenna arrays, and obtaining a receiving power of a beam signal by a power detection unit of each of the antenna arrays;

turning off the antenna array other than the antenna array which has the greatest receiving power, and calculating a first power ratio parameter corresponding to each of the antenna array which is turned off according to the receiving powers;

receiving the beam signal by the antenna array which is turned on, and calculating a first channel information of the beam signal corresponding to the antenna array which is turned on;

calculating a first virtual channel information corresponding to each of the antenna array which is turned off according to one or more first gains, one or more first delays and one or more first incidence angles of one or more paths from which the beam signal is received derived from the first channel information corresponding to the antenna array which is turned on, the first power ratio parameter corresponding to each of the antenna array which is turned off and an angle mapping table; and turning on one of the antenna arrays and turning off the other according to the first channel information and the first virtual information, wherein the angle mapping table records a transformation relationship of incidence angle for the same incident beam signal between the antenna arrays.

7. The method according to claim 6, wherein after the operation of turning on one of the antenna arrays and turning off the other according to the first channel information and the first virtual information, when the antenna array which is turned on is switched from one to another, further comprises:

receiving the beam signal by another antenna array which is turned on, and calculating a second channel information of the beam signal corresponding to another antenna array which is turned on; and updating the angle mapping table according to the second channel information.

8. The method according to claim 7, wherein in the operation of receiving the beam signal by another antenna array which is turned on, and calculating the second channel information of the beam signal corresponding to another antenna array which is turned on, the operation unit calculates a second virtual channel information corresponding to each of the antenna array which is turned off according to one or more second gains, one or more second delays and one or more second incidence angles of one or more paths from which the beam signal is received derived from the second channel information corresponding to another antenna array which is turned on, a second power ratio parameter corresponding to each of the antenna array which is turned off and the angle mapping table.

9. The method according to claim 8, wherein in the operation of updating the angle mapping table according to the second channel information, the operation unit updates the angle mapping table according to the second incidence angle.

10. The method according to claim 6, wherein in the operation of turning on one of the antenna arrays and turning off the other according to the first channel information and the first virtual information, the operation unit transforms each of the first channel information and the first virtual channel information to a RSNR and selects the antenna array which has the greatest RSNR to be turned on.

* * * * *